W. J. SCHAFFER.
PILOT BAR BUSHING.
APPLICATION FILED SEPT. 5, 1919.
1,355,168.
Patented Oct. 12, 1920.
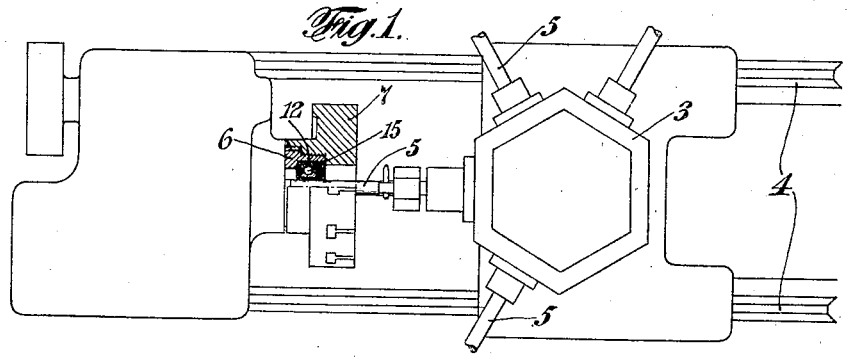
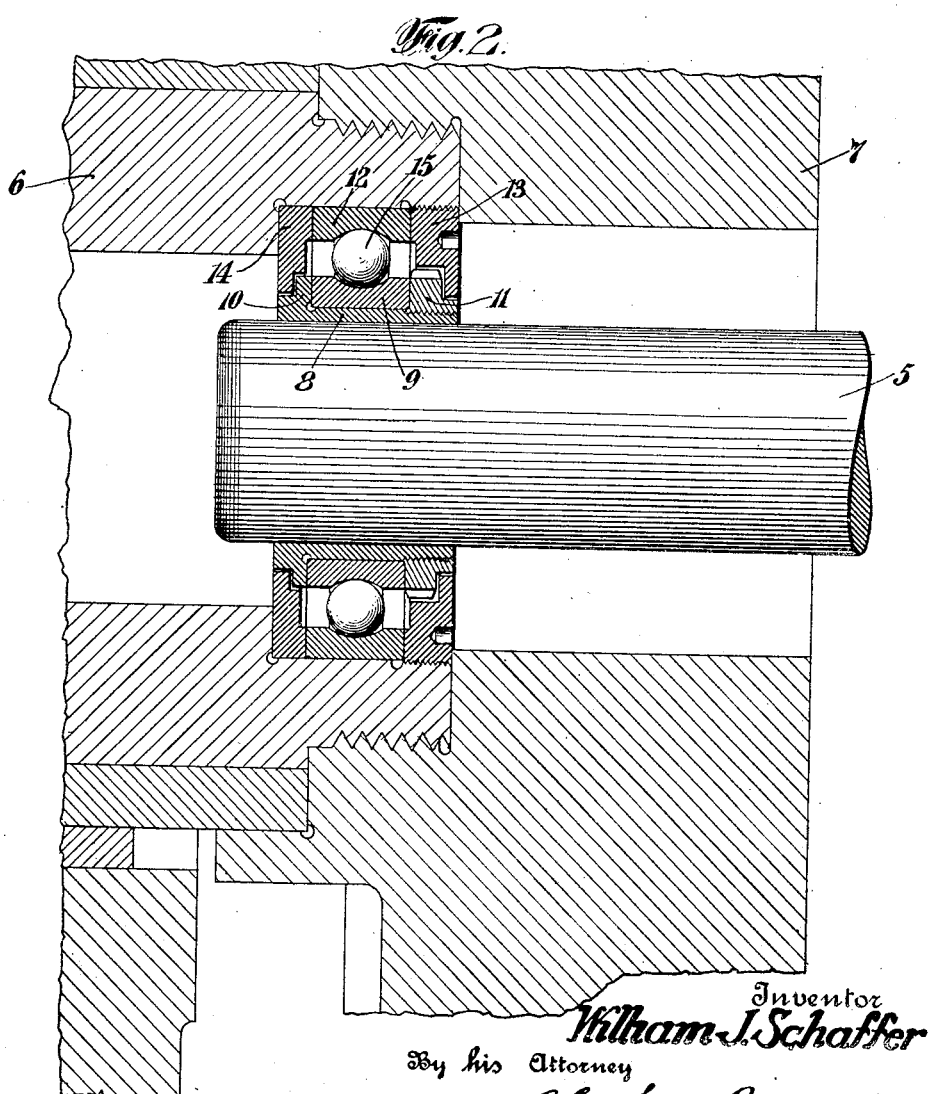
Inventor
William J. Schaffer
By his Attorney
Chas. Lyon Russell

UNITED STATES PATENT OFFICE.

WILLIAM J. SCHAFFER, OF HARTFORD, CONNECTICUT, ASSIGNOR TO S. K. F. BALL BEARING COMPANY, OF HARTFORD, CONNECTICUT, A CORPORATION OF CONNECTICUT.

PILOT-BAR BUSHING.

1,355,168.   Specification of Letters Patent.   Patented Oct. 12, 1920.

Application filed September 5, 1919. Serial No. 321,987.

*To all whom it may concern:*

Be it known that I, WILLIAM J. SCHAFFER, a citizen of the United States, residing at Hartford, in the county of Hartford and State of Connecticut, have invented certain new and useful Improvements in Pilot-Bar Bushings, of which the following is a specification.

My invention relates to machine tools provided with pilot bars and particularly those wherein the pilot bar is carried by a tool slide or the reciprocatory turret of a lathe, and has for an object to provide a wear eliminating contact or bond between the chuck or the rotary chuck carrying portion of the lathe and the pilot bar mounted upon the reciprocatory member. The pilot bar carrying member is frequently rotatable upon an axis perpendicular to the path of reciprocation.

In existing turret lathes the rotary chuck carrying head is provided with a socket, bored out to receive the pilot bar of the turret, also called the boring bar. When such a machine is in operation this socket, or rather the walls of it, rotate and the non-rotary pilot bar reciprocates not only back and forth within the rotating socket but also into and out of it, and furthermore, in most instances, a plurality of pilot bars coöperate interchangeably in sequence with a single socket. The effect of such movements as is well known, is the undue wearing away of the surfaces which are thus in engagement, in the structure just referred to, the bar and the walls of the socket. This, of course, lowers the efficiency of the pilot bar, necessitating tedious and wasteful repairs. For the purpose of eliminating the friction, overcoming the wearing away of the parts, particularly the pilot bars and adding to efficiency generally, I provide a bushing rotatable relatively to the chuck, through which the pilot bar reciprocates, but which bushing does not rotate relatively to the bar, with except possibly a slight creeping, and interpose an anti-friction bearing between such bushing and the rotary chuck carrying portion of the lathe, this being preferably a combined radial and double thrust bearing. Such bearing holds the bushing against axial displacement and permits it to readily remain substantially stationary, or, in other words, partake of the rotary motion of the pilot bar, which generally is *nil*. It also permits a limited amount of self-alinement between the pilot bar and the socket or rotary head. This self-alinement not only occurs through the period of reciprocation of the bar within the bushing but also at the instant the bar enters and leaves the bushing. Another object of the invention is to provide the ball bearing bushing carried by the chuck or rotary head with an engaging surface of considerable extent longitudinally of the pilot bar. Such pilot bar engaging surface may be formed on a bushing mounted in the inner ring of the ball bearing, whereby a standard width of ball bearing may be used in this connection and have such an extended width of surface engagement with the bar that the tendency, which in some instances is present, of the inner ring to tip or cant as the bar weaves through it is minimized.

In the drawings accompanying this specification, one practicable application of my invention is illustrated, in which drawings—

Figure 1 is a plan view of a portion of a well-known form of turrent lathe equipped with my improvement, the presence of which being revealed by the partial horizontal section, and Fig. 2 is a view partly in central longitudinal section showing the broken away end of the pilot bar of such a machine as is shown in Fig. 1, a part of the chuck carrying portion, and my improved bushing located therein.

In Fig. 1 there is shown the bed of a turret lathe which is equipped with a turret 3 movable on ways 4, and capable of carrying several sets of tools in a well known manner. The turret carries a pilot bar for coöperation with a plurality of the sets of tools which are or may be mounted on the turret as occasion demands, such pilot bars being designated by the reference character 5. The rotary or driving portion of the lathe, designated by the reference character 6, may, for convenience, be termed a rotary element or head. Fast upon this rotary element and adapted to rotate therewith, is the body 7 of the chuck. In operating a machine tool of this character the piece of work operated upon is clamped in the chuck in some suitable or well-known manner. The set of tools for operating upon the work at the stage to which it has been advanced are brought into position, whereupon the turret moves toward the chuck and the pilot bar 5 enters within the central opening of the chuck, the axis of rotation of the chuck coinciding with the geometrical axis of the pilot bar. The pilot bar is for the purpose of engaging the walls of a socket within the chuck, or carried by some part associated therewith, in such a manner that the working point of the tool or tools will be centered or precisionized relatively to the work carried by the chuck. In many instances the operation of the tools is carried on during the advance movement of the turret, and some times during its retreating movement as well, such tool operation and movements taking place while the pilot bar is performing its duty in engagement with the walls of the socket.

According to my invention the walls of the socket for the engagement of the pilot bar are afforded by a carefully machined and well hardened separate bushing 8, which although rigidly carried by the rotary member, and rigidly connected with the chuck, as far as radial movement is concerned, is nevertheless removable and interchangeable for the purpose of repairs and is also capable of rotation relatively to the rotating parts, such relative rotation being permitted by anti-friction construction. In the drawing there is illustrated a ball bearing associated with the bushing, the inner ring 9 of which bearing is shown as a piece separable from the portion of the bushing carrying the socket forming walls, this piece being clamped between a flange 10 forming a shoulder at one end of the bushing and a shoulder forming nut 11 at the other end. The sleeve member or bushing 8 gives an extended bar engaging face to the inner ring. The outer ring 12 of the bearing is shown mounted in a socket in the end of the driving spindle 6 of the lathe, which socket in the present illustration is in part contained within the outline of the body of the chuck. The ring 12 is clamped in place by means of a suitable nut 13. At the inner end of the socket is illustrated a ring 14, between which ring and the ring 13 the outer ring 12 of the bearing is positioned. The formation of the socket forming walls of the bushing and of the surface of the pilot bar are such that the pilot bar is adapted to enter into the bushing at any point in its rotation relatively thereto and is not impeded in its advance by the necessity of finding a seat or predetermined point for entrance.

A labyrinth for preventing the escape of lubricant or the intrusion of foreign matter is provided at the respective ends of the bushing between the members 11 and 13 and the members 10 and 14. There is shown interposed between the rings of the ball bearing a suitable set of balls 15. There is, as is well known, in most single row deep groove ball bearings, a capability of self-alinement within a limited degree. The walls forming the labyrinth are provided with sufficient clearance to permit the bushing 8 to have an amount of self-alining movement sufficient to meet the requirements of the present situation. The clearance, however, is so small that the bushing does not get out of alinement while the pilot bar is withdrawn to such an extent that jar or injury is effected upon its reëntrance into the socket. In most instances, the natural tendency of the rings of such a ball bearing to assume their proper relative positions will be effective to overcome any such difficulty. It is desirable, nevertheless, to guard against unusual displacements which may result in delays and accidents.

The advantage of extending the normal width of the inner ring was pointed out in the introductory portion hereof.

With the foregoing description, together with the introductory remarks, it is believed that a further detailed description of the mode of operation and advantages of the device is unnecessary.

It will be understood that the specific form of the improvement described and shown in the drawings is illustrative of my invention, it being a form which I have found useful in practice, and that changes may be made as occasion demands within the scope of the claims without departing from the spirit of the invention.

I claim as my invention:

1. In a machine tool, the combination with a work holding chuck, a carriage reciprocatory toward and from the chuck, and a bar mounted on the carriage and having a pilot portion, there being relative rotation between the chuck and bar, of a bushing within the chuck for engaging the said pilot portion of the bar for precisionizing the bar in relation to the chuck, the pilot bar being adapted to enter into the bushing at any point in its rotation relatively thereto, and rolling anti-friction elements disposed between the bushing and the chuck.

2. A machine tool as set forth in claim 1, wherein the anti-friction elements and associated parts permit limited self-alinement between the bushing and the chuck.

3. A machine tool as set forth in claim 1, having a self-alining ball bearing between the bushing and the chuck.

4. In a machine tool, the combination with a rotary chuck having a socket, of a rotary and reciprocatory turret, a pilot bar rigid with the turret, a bushing having a socket for receiving the pilot bar and provided on the outer side with a ball race, the socket of the chuck being provided with a ball race, and a row of balls disposed in such ball races and uniting the bushing and chuck.

5. The combination with a rotary chuck, of a bushing within the chuck, a self-alining combined radial and thrust ball bearing mounted in the chuck and carrying the bushing, and a non-rotatable pilot bar adapted to repeatedly enter into, reciprocate within and leave the bushing.

6. As an article of manufacture, a bushing having a socket adapted to receive a pilot bar, a ball bearing surrounding said bushing, the inner ring of the ball bearing being clamped to the bushing, labryinth forming members associated with the rings of the ball bearings and constructed to afford sufficient clearance to permit a limited amount of self-alinement between the rings of the bearing.

7. The combination with a chuck, of a bushing within the chuck, a self-alining combined radial and thrust ball bearing mounted in the chuck and carrying the bushing, and a pilot bar adapted to repeatedly enter into, reciprocate within and leave the bushing, the chuck and pilot bar being adapted to rotate one relatively to the other.

In testimony whereof, I sign my name hereto this 2nd day of Sept., 1919.

WILLIAM J. SCHAFFER.